Feb. 21, 1967 KOSUKE KITAMURA 3,305,628

PHASE-CORRECTING DEVICE IN BEAM-INDEXING COLOR TELEVISION RECEIVER

Filed March 2, 1964 2 Sheets-Sheet 2

3,305,628

PHASE-CORRECTING DEVICE IN BEAM-INDEXING COLOR TELEVISION RECEIVER

Kosuke Kitamura, Fuchu-shi, Japan, assignor to Kabushiki Kaisha Hitachi Seisakusho, Tokyo-to, Japan, a joint-stock company of Japan Filed Mar. 2, 1964, Ser. No. 348,695
Claims priority, application Japan, Mar. 8, 1963, 38/10,586
1 Claim. (Cl. 178—5.4)

This invention relates to beam-indexing color television receivers and more particularly to a new phase-correcting device of high effectiveness and advantageous features for said receivers.

In heretofore known beam-indexing color television receivers, a so-called beam-indexing signal is detected in each case, and, because there is a signal delay time in the operational stage of converting the signal so detected into a color signal, the color signal is caused to have a phase error with respect to the deviation of the indexing signal frequency, wherefore the picture quality is adversely affected. For this reason, the fluctuation of the frequency of the beam-indexing signal is limited to a certain range.

As one example, in the case of a delay time which is approximately equal to 1 microsecond, it is not possible to hold the phase error of the color signal (hereinafter referred to as "color error") within 10 degrees unless the fluctuation of the frequency of the beam-indexing signal is within 0.5 percent. Accordingly, in order to reduce the color error and obtain true color reproduction, it is necessary to limit the fluctuation of the indexing signal frequency as much as possible, at least to the above mentioned 0.5 percent or less.

In a beam-indexing color television receiver, the fluctuation of the indexing signal frequency detected from the picture tube is caused principally by the scattering fluctuation in the pitch or spacing of the index strips and the fluctuation in the horizontal scanning velocity. In actual practice, it is difficult to reduce these fluctuations to, for example, 0.5 percent or less, and since, in order to satisfy this condition, technical and economical limitations are encountered, it is difficult to produce receivers of the instant type on a commercially feasible basis, and the advantages arising from the use of a single electron gun are lost.

It is an object of the present invention, in its broad aspect, to overcome the above described difficulties.

More specifically, it is an object to provide a phase-correcting device for beam-indexing color television receivers whereby the manufacturing of said receivers is greatly facilitated, and the product quality thereof is greatly elevated.

The foregoing objects, as well as other objects and advantages as will presently become apparent, have been achieved by the present invention, which, briefly described, resides in a phase-correcting device for use in beam-indexing color television receivers, which accomplishes correction in a direction such as to reduce the color error arising in the operational stage wherein an indexing signal is detected and is converted into a color signal, and which functions to broaden the allowable ranges of magnitudes of the aforementioned various fluctuations.

The nature, principle, and details of the invention will be more clearly apparent by reference to the following description, beginning with a brief consideration of a receiver of the instant type of known design, presented merely for the purpose of comparison, and concluding with a description of a preferred embodiment of the invention, reference being made to the accompanying drawings in which like parts are designated by like reference characters, and in which.

Figure 1:
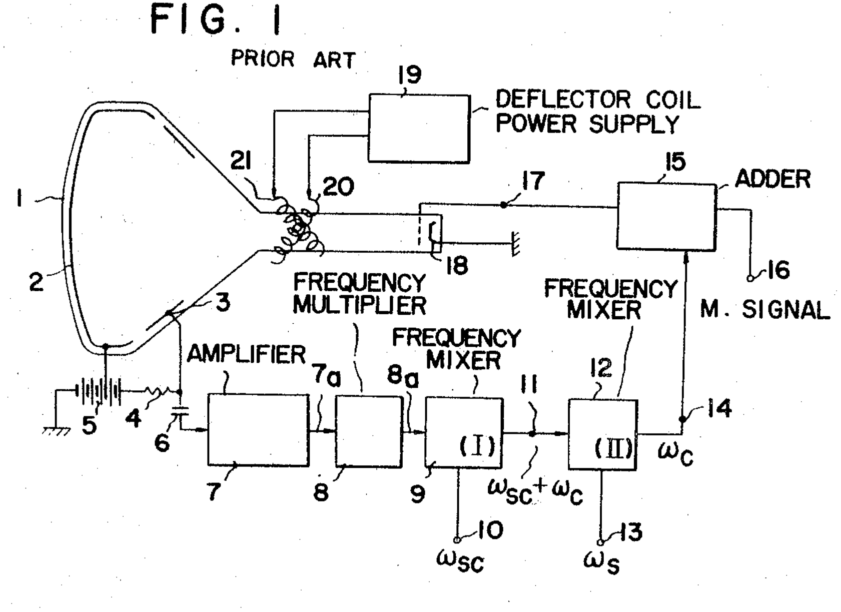
FIG. 1 PRIOR ART
FIGURE 1 is a schematic block diagram indicating the composition and arrangement of one example of a beam-indexing color television receiver of known type.
Figure 2:
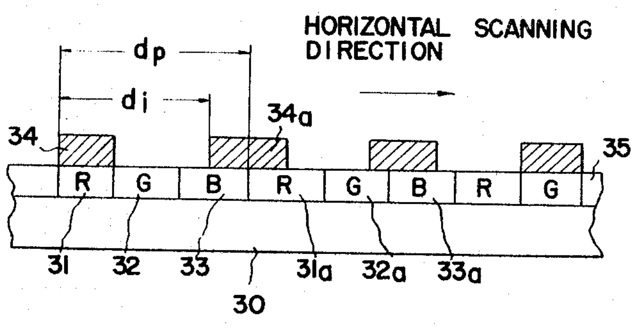
FIG. 2 PRIOR ART
FIGURE 2 is an enlarged, sectional view showing a fragment of the phosphor face plate of the color picture tube used in the receiver shown in FIGURE 1.

The beam-indexing color television receiver of known type shown in FIGURES 1 and 2 has the following operation:

The beam-indexing picture tube 1 as shown in FIGURE 1 has a face plate of a construction, as shown in section in FIGURE 2, wherein, on the interior surface of a glass plate 30, there are secured consecutive groups of red, green, and blue phosphor strips 31, 32, 33 . . . in contiguous disposition with a metal back 35 disposed thereon. Beam-indexing materials 34, 34$_a$, . . . are disposed with a certain relationship to the phosphor strips for the purpose of taking out the indexing signal, the said materials being such (for example, magnesium oxide) as to discharge secondary electrons upon being irradiated by an electron beam. The groups of phosphor strips and the beam-indexing materials are arranged in a direction which is not parallel to the horizontal scanning direction, and their pitches or spacings (respectively designated by $d_p$ and $d_i$), in general, have a relationship such that $d_p/d_i=m/n$, where $m$ and $n$ are positive integers.

The secondary electrons repeatedly discharged from the indexing material when an electron beam impinges on the face plate 2 are collected in a secondary electron collector 3 and flow through a load resistor 4, whereby the signal in the form of voltage is produced and, passing through a high-voltage blocking capacitor 6, is amplified to a suitable magnitude by a beam-indexing signal amplifier 7. The signal at the output end 7$_a$ of the amplifier 7 is a signal which has the repetition frequency with which the electron beam impinges on the indexing material. The frequency of this signal is multiplied by $n/m$ by a frequency multiplier 8 and is multiplied to a frequency (denoted hereinafter by $\omega_c$) which is equal to the repetition frequency with which the electron beam impinges on phosphor strips of the same kind such as, for example, 31, 31$_a$, . . . .

In order to transform a color video signal which has arrived into a dot sequential color signal with a frequency $\omega_c$, a frequency mixer (I) 9 and a frequency mixer (II) 12 are used. That is, through a terminal 10, a chrominance-carrier reference $\omega_{sc}$ (=3.6 mc.) is applied, a signal $\omega_{sc}+\omega_c$ being thereby obtained from the output terminal 11 of the frequency mixer (I) 9, and, in the frequency mixer 12, this signal produces a beat with a chrominance signal applied through a terminal 13, a color signal of the frequency $\omega_c$ thereby being obtained at the output terminal 14. Then, in an adder 15, a signal M, which has been signal converted separately by means not shown, is added to the signal obtained at the terminal 14 to produce a so-called dot sequential signal. By applying this signal through a terminal 17 to an electrode of the picture tube and density modulating the electron beam, a red signal, for example, is obtained when the electron beam impinges on a red phosphor strip, and sequential colors are reproduced in the same manner for green and blue.

In order to indicate fully the nature of the present invention, the following analytical consideration, which leads to the principle of the invention, of the interrelation between the various, aforementioned fluctuations, the group delay times of the signal transmission system, and the aforementioned color error is presented.

In this analysis, the deviation of the horizontal scanning velocity will be denoted by $\delta$ (percent), the specified velocity by $x$ (mm./sec.), the specified pitches by $d_p$ and $d_i$ (mm.), respectively, and the fluctuation of the pitch of the indexing material by $\epsilon$ (percent), the deviation of the phosphor materials being considered to be equivalently included in this fluctuation $\epsilon$. In addition, the difference between the phase at a frequency of $\omega_{co}$ of the indexing signal and phase when the frequency becomes $\omega_{co}+\Delta\omega$ will be denoted by $\Delta\phi$ (degrees) (becoming the color error), and the group delay time of the signal transmission system from the terminal 3 to the terminal 17 will be denoted by $\tau_t$ (seconds). Furthermore, the following relationships will be taken to be valid.

$$\omega_{co}+\Delta\omega=\frac{v\left(1+\frac{\delta}{100}\right)}{d_i\left(1+\frac{\delta}{100}\right)} \simeq\frac{v}{d_i}\left(1+\frac{\delta-\epsilon}{100}\right) \qquad (1)$$

$$\omega_{co}=\frac{v}{d_i} \qquad (2)$$

Then, the following relationship is obtained.

$$\Delta\omega=\omega_{co}\cdot\frac{\delta-\epsilon}{100} \qquad (3)$$

As a result, the following expression is obtained.

$$\frac{2\pi\cdot\Delta\phi}{360}=(\tau_i+\tau_d)\Delta\omega\cdot\frac{n}{m}+(\tau_{c1}+\tau_{c2})\Delta\omega\cdot\frac{n}{m}+\tau_p\cdot\Delta\omega\cdot\frac{n}{m} =\tau_t\cdot\Delta\omega\cdot\frac{n}{m} \quad \text{(rad.)} \qquad (4)$$

where: $\tau_i$ is the group delay time (seconds) of the indexing amplifier 7; $\tau_d$ is the group delay time (seconds) of the multiplier 8; $\tau_{c1}$ is the group delay time (seconds) of the frequency mixer 9; $\tau_{c2}$ is the group delay time (seconds) of the frequency mixer 12; $\tau_p$ is the group delay time of the adder 15; and $\tau_t$ can be expressed by the following equation.

$$\tau_t=\tau_i+\tau_d+\tau_{c1}+\tau_{c2}+\tau_p \qquad (5)$$

From Equations 3 and 4, the following equations are derived.

$$\frac{2\pi\cdot\Delta\phi}{360}=\tau_t\cdot\frac{n}{m}\cdot\omega_{co}\cdot\frac{\delta-\epsilon}{100} \quad \text{(rad.)}$$

$$\tau_t(\delta-\epsilon)=\frac{2\pi\times m}{3.6\times\omega_{co}\times n}\Delta\phi \quad \text{(sec.)} \qquad (6)$$

Under the conditions of $n=2$, $m=3$, $$\omega_{co}=2\pi\times 8.25\times 10^{+6} \text{ (rad./sec.)}$$

and $\Delta\phi=10$ degrees, the following equation is obtained in the case of $\tau_t=1\times 10^{-6}$ (second).

$$\delta-\epsilon\approx 0.5 \text{ (percent)} \qquad (7)$$

This means that, since the quantities $\delta$ and $\epsilon$ are mutually independent deviations, the sum of the horizontal velocity fluctuation and the forementioned pitch fluctuation must be 0.5 percent.

On the basis of the foregoing theoretical consideration, the operation and unique character of the device of the present invention will now be described with reference to FIGURE 3.

Figure 3:
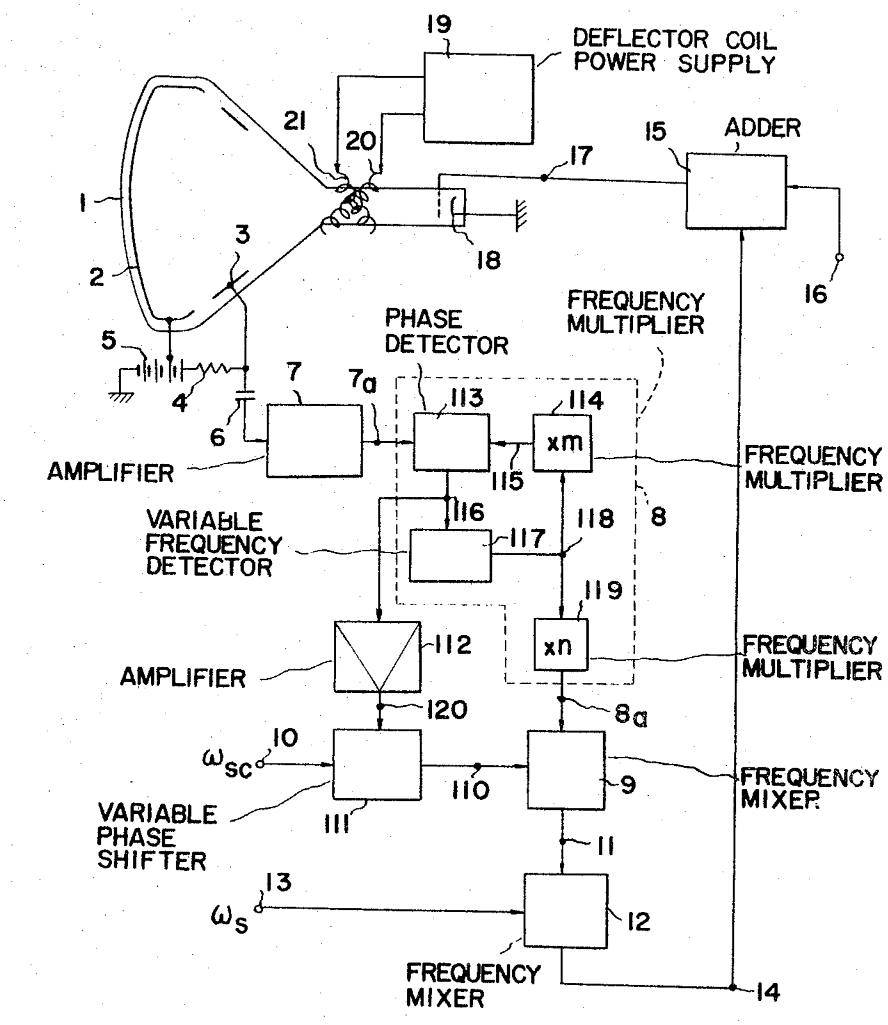
FIGURE 3 is a schematic block diagram showing the composition and arrangement of a beam-indexing color television receiver in which the preferred embodiment of the phase-correcting device according to the invention is utilized.

In the receiver shown in FIGURE 3, there is provided a frequency multiplier 8 comprising a phase detector 113, a variable frequency oscillator 117, an $m$-times frequency multiplier 114, and an $n$-times frequency multiplier 119, and constituting a kind of automatic phase control type frequency multiplier. A portion of the output signal from the phase detector 113 is amplified by an amplifier 112 and used as the phase control voltage $E_c$ (volt) of a variable phase shifter 111, which has the function of receiving the aforementioned chrominance-carrier reference wave as an input signal and causing the phase of its output signal to shift and lag by $\Delta\phi\lambda$ (radian), the characteristic thereof being taken to be representable by the following expression.

$$\Delta\phi\lambda=\lambda\cdot E_c \quad \text{(radian)} \qquad (8)$$

That is, it will be considered that when the phase control voltage produced at the terminal 120 is 1 volt, the shift angle lags by $\lambda$ radians.

According to the present invention, which is based on the observation that, when the frequency deviates from its median value, a color error develops in proportion to the magnitude of the deviation, this frequency deviation is detected by means of the frequency multiplier 8, and correction is applied by causing a phase shift in the opposite direction of a magnitude which is equal to the phase shift quantity. A signal so shifted has a frequency which is always constant, and, moreover, the part thereof whose rotation directly becomes the rotation of the color signal is selected.

The invention will now be considered quantitatively. It is a characteristic of the phase detector 113 that, in general, between the output $V_c$ and the phase difference $\Delta\theta$ between the two input signals, there exists the following relationship:

$$V_c=\mu\sin\Delta\theta \quad \text{(volt)} \qquad (9)$$

The variable-frequency oscillator 117 is so selected as to have a characteristic such that it oscillates at a frequency of $1/m\cdot\omega_{co}$ (rad./sec.) when the frequency is representable by the following equation, $$\omega=\frac{\omega_{co}}{m}+2\pi\beta\cdot V_c \quad \text{(rad./sec.)} \qquad (10)$$

that is, when $V_c=0$, and such that, when an input voltage $V_c$ of 1 volt is applied, an increase in frequency of $2\pi\beta$ (rad./sec.) is effected.

Accordingly, the frequency of the signal at the output terminal 8$_a$ of the frequency multiplier 8 becomes $n\omega$, and from the above Equations 9 and 10, the following equations are obtained.

$$n\omega=\frac{n}{m}\cdot\omega_{co}+2\pi\cdot n\beta\cdot\mu\sin\Delta\theta \qquad (11)$$

$$\therefore\Delta\theta=\sin^{-1}\frac{\left(n\omega-\frac{n}{m}\cdot\omega_{co}\right)}{2\pi\cdot n\cdot\beta\cdot\mu} \quad \text{(rad.)} \qquad (12)$$

Since $n\omega$ has been caused to be $n/m$ times the input frequency, it may be represented as follows:

$$n\omega=\frac{n}{m}(\omega_{co}+\Delta\omega) \quad \text{(rad./sec.)} \qquad (13)$$

By substituting Equation 13 into Equation 12, the following expression is obtained.

$$\Delta\theta=\sin^{-1}\frac{\frac{n}{m}\cdot\Delta\omega}{2\pi\cdot n\cdot\beta\cdot\mu} \quad \text{(rad.)} \qquad (14)$$

By substituting Equation 14 into Equation 9, the following expression is obtained.

$$V_c=\frac{1}{2\pi\cdot n\cdot\beta}\cdot\frac{n}{m}\cdot\Delta\omega \quad \text{(volt)} \qquad (15)$$

This voltage is amplified by A times in the amplifier 112, wherefore, the phase control voltage $E_c$ may be expressed by the following equation.

$$E_c=AV_c=\frac{A}{2\pi\cdot n\cdot\beta}\cdot\frac{n}{m}\cdot\Delta\omega \quad \text{(volt)} \qquad (16)$$

By substituting Equation 16 into Equation 8, the following expression is obtained.

$$\Delta\phi\lambda=\frac{\lambda\cdot A}{2\pi\cdot n\cdot\beta}\cdot\frac{n}{m}\cdot\Delta\omega \qquad \text{(rad.)} \qquad (17)$$

That is, in a device of the above described composition and arrangement, when the indexing frequency deviates by $\Delta\omega$ rad./sec. from the median value, the phase of the chrominance-carrier reference passing through the terminal 110 is shifted from the specified value by a quantity equal to $\Delta\phi\lambda$ radians expressed by Equation 17. The output phase of the frequency mixer 9 shifts by $\Delta\phi\lambda$ radians as a natural result due to the character of the mixer.

Accordingly, the phase shift angle in this case at terminal 17 is the angle obtained from Equation 4 increased additively by $\Delta\phi\lambda$ and becomes as follows:

$$\frac{2\pi\cdot\Delta\phi}{360}=\tau_t\cdot\Delta\omega\cdot\frac{n}{m}+\Delta\phi\lambda$$

$$=\left(\tau_t+\frac{\lambda\cdot A}{2\pi\cdot n\cdot}\right)\cdot\frac{n}{m}\cdot\Delta\omega \qquad \text{(rad.)} \qquad (18)$$

In the case when $$\lambda A=-2\pi\cdot n\cdot\beta\cdot\tau_t \qquad (19)$$

the right-hand side of Equation 18 becomes zero, in which case, no color error occurs irrespective of the value of $\Delta\omega$. In actual practice, although the values of $\beta$, $\tau_t$, and $\lambda$ are caused to vary somewhat by the value of $\Delta\omega$, the color error is amply corrected and becomes small.

According to results of an example of actual application, the following numerical values were obtained for the case of $m=3$ and $n=2$.

$$\beta=0.9\times10^6 \qquad \text{(c./s./V)} \qquad (20)$$

$$\tau_t=5\times10^{-6} \qquad \text{(s.)}$$

$$\therefore\lambda A=-2\pi\times9 \qquad \text{(rad./V)}$$

$$=-9 \qquad \text{(c./V)} \qquad (21)$$

The operational range of the frequency multiplier 8 is determined by $\mu$, $\beta$, and other variables, and it was confirmed that with an input frequency of 8.25 mc./sec., normal operation takes place within a range of a width of 24 kc./s. with the said input frequency as a median value. Accordingly, if correction is to be effected by a quantity equal to that of phase shifting within this range, the following computation can be made.

$$\tau_t\times240\times10^3=5\times10^{-6}\times240\times10^3$$

$$=1.2 \qquad \text{(c.)} \qquad (22)$$

The construction, with the use of several phase shifters, of a circuit to cause a phase rotation of 1.2 c. with respect to a variation of the input voltage is relatively simple. Thus, by the application of the device of this invention, since fluctuations of the indexing frequency do not become color errors in the case of normal operation it is possible to widen the allowable ranges with respect to the deviations of the aforementioned horizontal scanning velocity and pitch between the index material. According to the above described example, the allowable quantity becomes $0.24/8.25\times100\approx3$ percent, whereby the design of the horizontal deflection circuit and the fabrication of the picture tube is facilitated. Furthermore, the invention affords various other advantageous features such as ease in designing and adjusting the variable phase shifter since its frequency is constant.

It should be understood, of course, that the foregoing disclosure relates to only a preferred embodiment of the invention and that it is intended to cover all changes and modification of the example of the invention herein chosen for the purposes of the disclosure, which do not constitute departures from the spirit and scope of the invention as set forth in the appended claim.

What is claimed is:

A phase-correcting device in a beam-indexing color television receiver comprising a beam-index signal amplifier; a reference sub-carrier; and chrominance signals; a frequency multiplier connected to said amplifier and consisting essentially of an automatic phase control circuit comprising a phase detector, a variable frequency oscillator and a plurality of frequency multipliers; a couple of frequency mixers for obtaining color signals from the output of said automatic phase control circuit, reference sub-carrier and chrominance signals; means for detecting, from the output of said phase detector, deviations in frequency of the beam-index signal thereby producing a detection signal; and means for effecting rotation of the phase of said frequency deviations in the direction in which the difference between the phase angle of the color signal shifting in accordance with the group delay time of the indexing signal amplification and the phase angle of the reference sub-carrier wave to be applied to one of said frequency mixers is reduced.

References Cited by the Examiner

UNITED STATES PATENTS

| | | | |
|---|---|---|---|
| 2,967,210 | 1/1961 | Kell | 178—5.4 |
| 3,076,869 | 2/1963 | Tyson | 178—5.4 |
| 3,199,037 | 8/1965 | Graves | 323—101 |

DAVID G. REDINBAUGH, *Primary Examiner.*

J. H. SCOTT, J. A. O'BRIEN, *Assistant Examiners.*